2,467,594

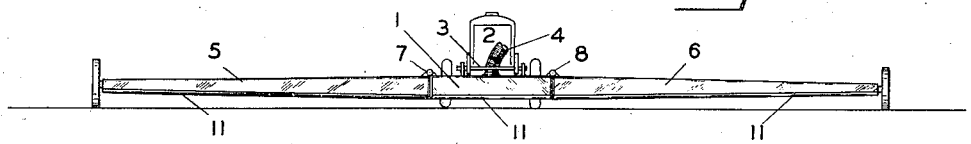
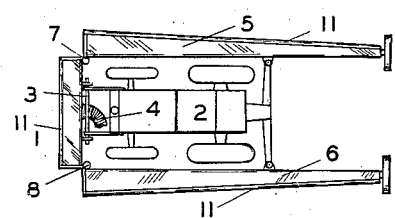
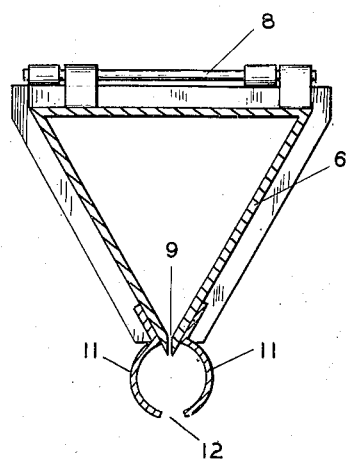
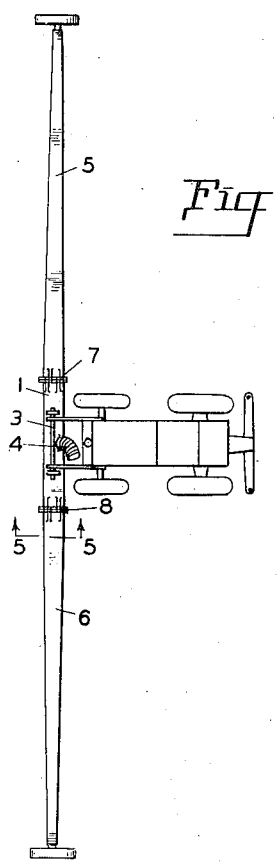
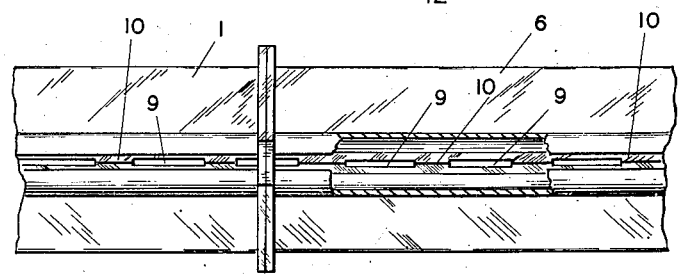
April 19, 1949.    A. R. NICHOLS    2,467,594
DUSTING BOOM
Filed March 19, 1946
INVENTOR.
ARCHIE R. NICHOLS
BY
ATTORNEY Patented Apr. 19, 1949

UNITED STATES PATENT OFFICE 2,467,594

DUSTING BOOM

Archie R. Nichols, Forest Grove, Oreg.

Application March 19, 1946, Serial No. 655,491

3 Claims. (Cl. 43—145)

This invention relates to agricultural implements and more specifically to a duster boom for dusting crops, the boom being mounted on a tractor.

The object of the invention is to apply an even coating of dusting powder, as an insecticide, to growing crops.

This is done by a fan, a means for supplying insecticide dust to the fan delivery and a means for diverting the dust laden air from the fan delivery downward onto rows or hills of growing crops. My invention relates solely to delivery means and the fan and its appliances will be represented by an opening through which the dust and air mixture reaches my invention.

Dust, carrying insecticide, is very hygroscopic, that is, it has an affinity for moisture and rapidly turns to a sticky paste that can serve no useful purpose but clogs up any dust delivery means moisture will work into, even against the outgoing stream of dust laden air which cannot have high velocity without heavy waste.

A drawing, showing a dusting boom embodying the invention, accompanies and forms a part of this specification, in which:

Fig. 1 is a front end view of the boom that will be presumed to be mounted on a tractor, not shown;

Fig. 2 is a view looking downward on the boom folded for travel, not being working, with its relationship to a tractor being indicated;

Fig. 3 is a top view of the structure shown in Fig. 1;

Fig. 4 is an enlarged fragment of the boom with a part broken away; and

Fig. 5 is a typical section of the boom, taken at 5—5 of Fig. 3, enlarged for clarity.

The boom as a whole is of triangular cross-section, with a median section 1, attached to a tractor 2, by a long hinge 3, from which it hangs downward as shown in Figs. 1 and 3. A dust supply means is represented by the broken tube 4, which will form the delivery from the well known dust mixer and fan which has been omitted as it is no part of the invention.

The median portion 1 serves as a support for tapered boom sections at each end, identified by numerals 5 and 6, the same being hinged to the median section 1 by hinges 7 and 8, as shown in Fig. 1. These tapered end sections will be tapered to a calculated cross section to improve the distribution of dust carrying air delivered by the dust supply system. The boom may be folded for travel at other places than in the field.

All of the sections are provided with delivery slits 9 which are narrow slits, usually of the order of 3/32" wide; usually also with short bridges 10, to maintain their width and these narrow slits invariably cause trouble if any moisture is present, such as dewdrops on the growing crops to be dusted. The particles of moisture become dislodged, mix with the dust in the slits despite the outcoming air and clog the machine into unworkability in a short time. This detracts heavily from the effectiveness of dusting which is much better with dew on the plants as the dust then adheres to the plants like it does to the machine as described, supra.

I have completely remedied the tendency for moisture to interfere with the slits 9 by appending a dependent moisture guard 11, provided with an open bottom slot, wider than the dust slits, which is the essence of this invention. It is shown to have a bottom outlet 12, which is wider than the slits 9. It may be rolled of the same metal that forms the sections of the boom, or attached as shown. The arcuate form of the oppositely facing parts is shown because my first one made that way was successful. The oppositely facing parts should be spaced far enough to converge and form the slot, and the parts are spot-welded in place or attached in another convenient manner.

Having fully disclosed my invention so that its necessary structure can be understood by anyone familiar with the manufacture and use of such an implement, what I claim as new and desire to secure by Letters Patent, is:

1. A dust boom comprising a boom member of generally triangular cross section, one edge of said triangle section arranged to be on the underside of the boom when the same is in use, said edge being provided with narrow dust slits and said dust slits being protected by an appended moisture guard comprising a pair of oppositely facing members spaced to provide an open bottom slot wider than the dust slits.

2. A dust boom comprising a generally triangular cross section tapered dust boom member for carrying insecticide dust to crops, said boom being provided with downwardly opening dust emitting slits, characterized by said slits being guarded against moisture by a dependent double moisture guard comprising a pair of oppositely facing members spaced to define an open bottom slot that is longitudinally coextensive with said slits, the said slot being wider than the slits.

3. In a dust boom, a hollow boom member arranged to deliver dust to growing crops through a slit in the bottom thereof, characterized by the slit having a dependent two plate guard, each plate attached to the boom by one of its edges, the other two edges being spaced apart to form a slot below, longitudinally coextensive with, and of greater width than said slit so that dust will fall free from the said slit.

ARCHIE R. NICHOLS.

REFERENCES CITED

The following references are of record in the file of this patent:

UNITED STATES PATENTS

| Number | Name | Date |
| --- | --- | --- |
| 411,005 | Birmingham | Sept. 17, 1889 |
| 468,685 | Norton | Feb. 9, 1892 |
| 1,192,858 | Callahan | Aug. 1, 1916 |
| 2,388,798 | Parker | Nov. 13, 1945 |